United States Patent

[11] 3,601,154

[72] Inventor Henry William Demler, Jr.
  Lebanon, Pa.
[21] Appl. No. 769,786
[22] Filed Oct. 23, 1968
[45] Patented Aug. 24, 1971
[73] Assignee AMP Incorporated
  Harrisburg, Pa.

[54] SEALING MEANS FOR PRESSURE RESPONSIVE VALVE OR VALVES
  10 Claims, 7 Drawing Figs.
[52] U.S. Cl. .................................................. 137/612.1
[51] Int. Cl. .................................................. F16k 17/04
[50] Field of Search .................................................. 137/612.1,
  454.2; 251/330, 332, 357, 214

[56] References Cited
UNITED STATES PATENTS
| | | | |
|---|---|---|---|
| 3,308,847 | 3/1967 | Umann | 137/613 |
| 2,473,591 | 6/1949 | Killner | 251/357 X |
| 2,854,018 | 9/1958 | Kilmarx, Jr. | 137/612.1 X |
| 2,884,002 | 4/1959 | Melton et al. | 137/454.2 |
| 3,054,422 | 9/1962 | Napolitano | 251/334 X |
| 3,180,420 | 4/1965 | Manson, Jr. et al. | 137/454.2 X |
| 3,207,179 | 9/1965 | Klagues | 137/612.1 |
| 3,273,855 | 9/1966 | Wells | 251/332 X |
| 3,295,822 | 1/1967 | O'Bannon, Jr. et al. | 251/366 |
| 3,407,842 | 10/1968 | Zahuranec | 137/608 X |
| 3,467,357 | 9/1969 | Schomer et al. | 251/367 X |

FOREIGN PATENTS
| | | | |
|---|---|---|---|
| 1,275,876 | 10/1961 | France | 137/612.1 |

Primary Examiner—Samuel Scott
Attorneys—Curtis, Morris and Safford, Marshall M. Holcombe, William Hintze, William J. Keating, Frederick W. Raring, John R. Hopkins, Adrian J. La Rue and Jay L. Seitchik ABSTRACT: A valve has a body provided with a passageway therethrough. A valve seal is located along the passageway. A valve member is movably disposed in the passageway, and it is provided with a valve head sealingly mateable with the valve seat and a unitary annular sealing skirt in sealing engagement with the section of the passageway along which it moves.

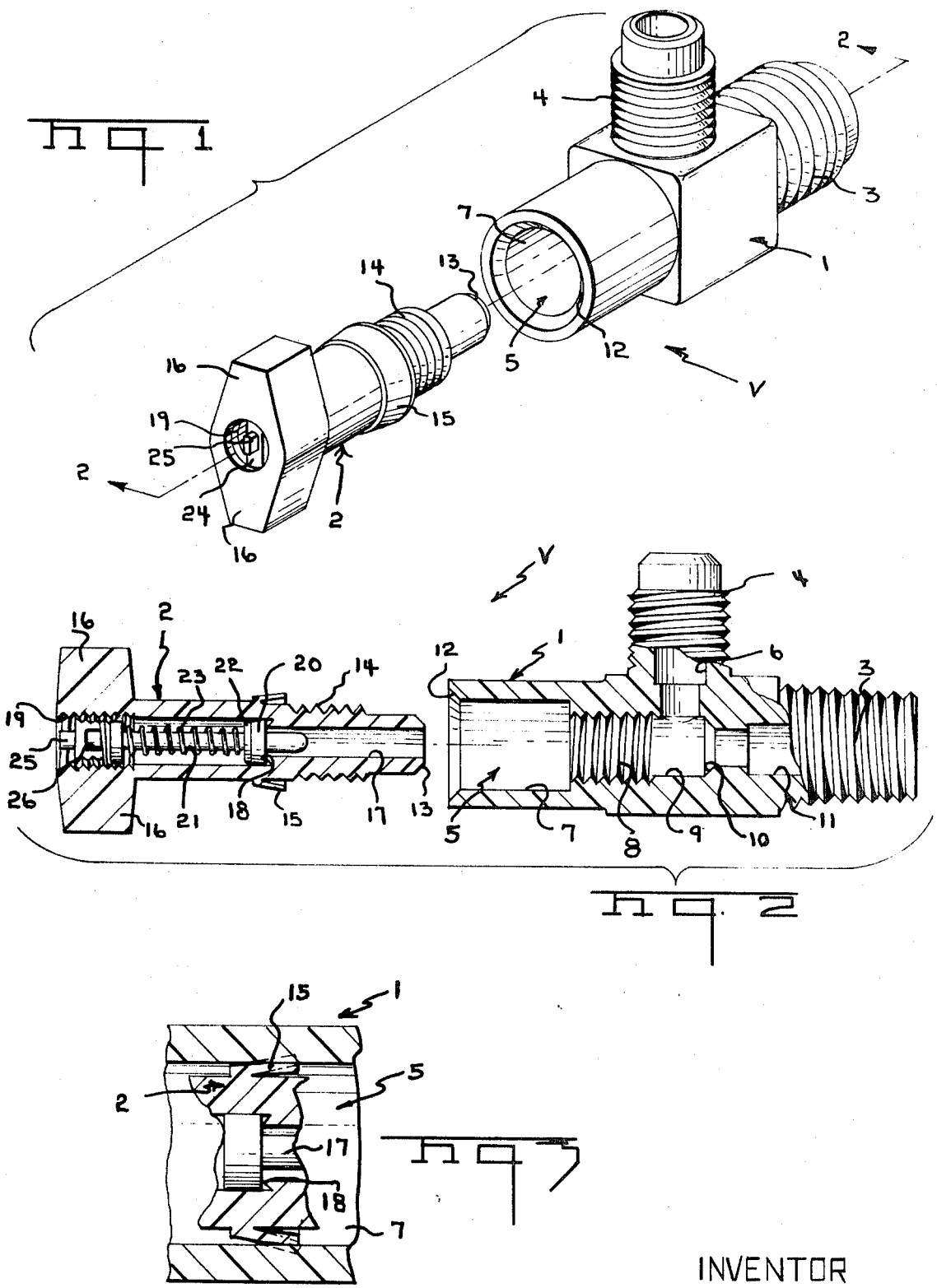

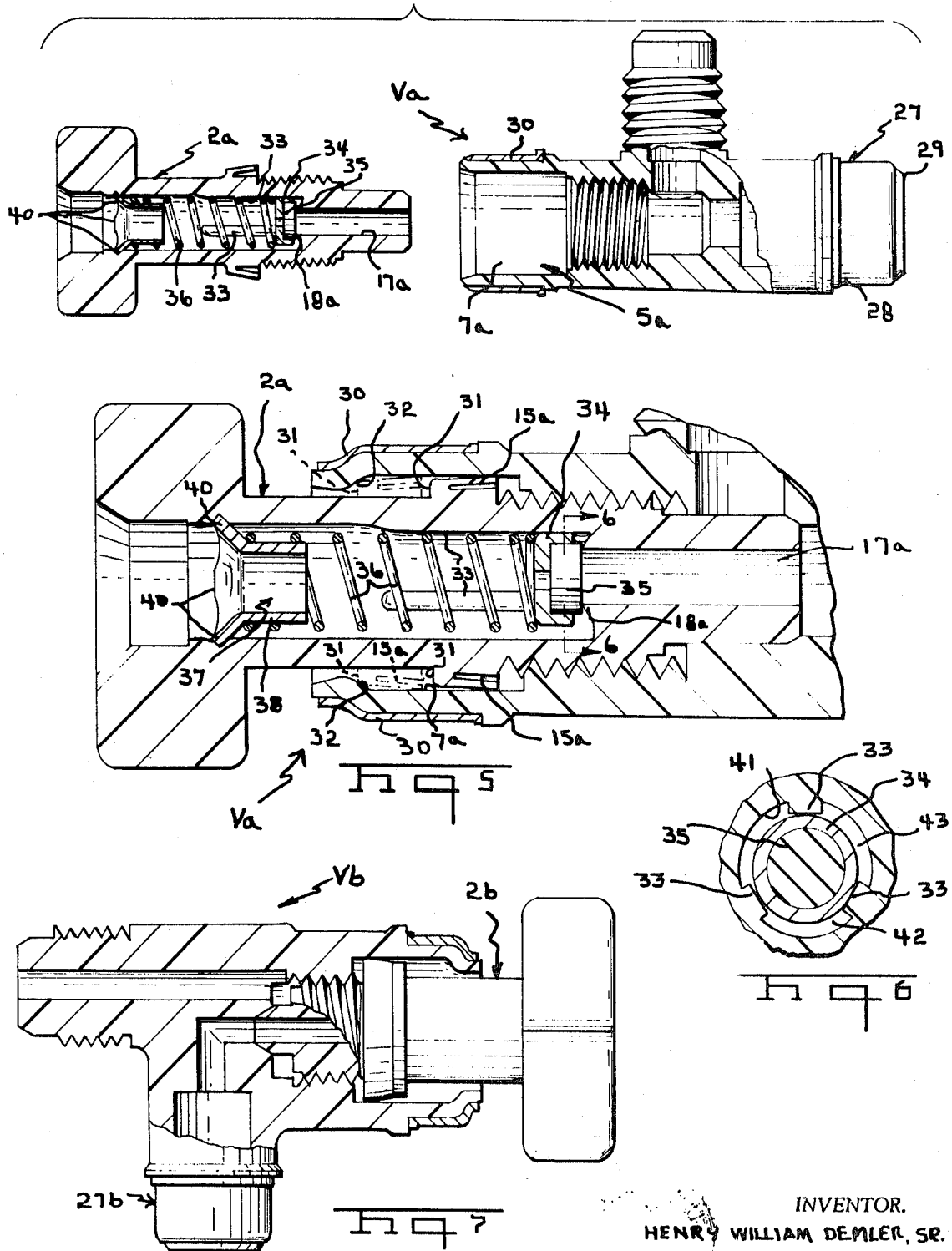

SEALING MEANS FOR PRESSURE RESPONSIVE VALVE OR VALVES

This invention relates to fluid seals and more particularly to fluid-seal means for a valve.

Fluid seals generally take the form of an O-ring, packing or similar arrangements. While these conventional sealing approaches have proven effective, they are additional elements in the makeup of fluid-sealing devices, they require additional time to apply and they have to be replaced on occasion due to diminution of the sealing characteristics of the sealing material.

An object of the invention is to provide unitary sealing means on a valve member for sealing engagement with a section of a passageway along which the sealing means moves.

Another object is the provision of unitary annular sealing skirt means of stiffly flexible material on a valve member.

A further object is to provide securing means on the body of the valve at an entrance to a passageway in which a valve member is movably disposed for securing the valve member in the passageway and providing a sealing seat when the valve member has been moved to a fully open position.

An additional object is the provision of a bypass valve means in a valve member having a unitary sealing means thereon.

Still a further object is to provide a bypass valve means which permits intermittent release of increased pressure conditions instead of permitting continuous release of increased pressure conditions.

A still additional object is the provision of a method of assembling a bypass valve to a predetermined spring pressure on the valve member.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIG. 1 is a perspective exploded view showing elements of a valve;

FIG. 2 is a view taken along lines 2—2 of FIG. 1;

FIG. 3 is a partial cross-sectional view of the valve member in position in the passageway of the valve body;

FIG. 4 is an exploded and partial cross-sectional view of an embodiment of the invention;

FIG. 5 is a view similar to FIG. 4 with the valve member in position in the valve body;

FIG. 6 is a view taken along lines 6—6 of FIG. 5; and

FIG. 7 is a partial cross-sectional view of a further embodiment of the invention.

Turning now to the drawings and more particularly to FIGS. 1 through 3, a valve V is illustrated including a valve body 1 and a valve member or stem 2. Valve body 1 is provided with an externally threaded section 3 and a threaded nipple 4. A passageway 5 extends through body 1 and another passageway 6 is in communication with passageway 5 which extends through nipple 4. Section 3 is to be threadably connected with a container or the like having fluid under pressure and nipple 4 is to be threadably connected with something for receiving the pressurized fluid.

Passageway 5 includes a tubular sealing section 7, a threaded section 8 which includes a nonthreaded bore 9 in communication with and comprising a part of passageway 6, a valve seat 10 and a bore 11 extending through section 3. The entrance to sealing section 7 is provided with a beveled surface 12.

Valve member 2 is provided with a seating surface 13 which is sealingly engageable with valve seat 10 when threaded section 14 is movable along threaded section 8 to thereby prevent the flow of fluid from passageway 5 into passageway 6 except when seating surface 13 has been moved away from valve seat 10. A stiffly flexible annular sealing skirt 15 is sealingly engageable with sealing section 7 as it is moved therealong by the rotation of valve member 2 under the influence of threaded sections 8 and 14. Sealing skirt 15 is unitary with valve member 2 and is formed thereon during the formation of valve member 2 and it normally has an annular disposition from its point of origin on valve member 2 to its free end thereof away from the axis of valve member 2 and it therefore is placed under spring tension when valve member 2 is positioned in passageway 5 with beveled surface 12 facilitating the movement of sealing skirt 15 within sealing section 7. When seating surface 13 is moved away from valve seat 10, sealing skirt 15 prevents any leakage out of passageway 5 and the pressure of the fluid against sealing skirt 15 increases the sealing effect thereof by forcing sealing skirt 15 tighter against sealing section 7. Wings 16 on valve member 2 enable an operator to effectively operate valve member 2 between its seated and unseated positions.

A bore 17 extends through valve member 2 and it includes a valve seat 18 and a threaded section 19. An annular sealing member or washer 20, which is made of rubber or plastic material, is positioned on a pin 21 against a collar 22 and sealing member 20 is maintained against valve seat 18 via coil spring 23 disposed around pin 21 between collar 22 and threaded plug 24 which is threadably secured in threaded section 19. Plug 24 is movably mounted on pin 21 and secured thereon by a flattened end 25 of pin 21. Plug 24 is movably disposed along threaded section 19 in order to provide proper spring tension via spring 23 onto sealing member 20 so that sealing member 20 in engagement with valve seat 18 acts as a bypass valve to permit the release of the pressurized fluid externally of the valve member 2 upon the pressure of such fluid exceeding the pressure exerted by spring 23. Slots 26 are provided in plug 24 in order to permit the passage of fluid when the bypass valve is operated.

Valve body 1 and valve member 2 are preferably molded from a suitable plastic material so that the memory of the plastic material maintains sealing skirt 15 against the wall of sealing section 7 and the additive pressure of the fluid forces sealing skirt 15 against this wall of sealing section 7 effecting the seal.

FIGS. 4 through 6 illustrate valve Va which is an alternative embodiment of valve V of FIGS. 1 through 3 and valve Va is the same except for the following exceptions. A crimpable section 27 is provided at one end of the valve body 1a which includes a metal ferrule 28 surrounding a tubular section 29 provided with a splined interior surface. Crimpable section 27 is crimpably secured onto a rigid tubular member of a pressurized source of liquid supply so as to sealingly secure valve Va thereon. Crimpable section 27 and the connection thereof to the tubular member is completely described in U.S. Patent No. 3,378,282. Crimpable section 27 of valve Va is in axial alignment with valve member 2a.

Another metal ferrule 30 is disposed along the exterior surface of valve body 1a along annular sealing section 7a and the outer end of ferrule 30 is necked down, as illustrated in FIG. 5 after valve stem 2a has been threadably mounted within passageway 5a, thereby preventing valve member 2a from being removed from valve body 1a. When valve member 2a has been moved to its fully opened position, shoulder 31 of annular sealing skirt 15a sealingly engages necked-down section 32 of sealing section 7a thereby providing a valve seat to form an additional seating area between valve member 2a and passageway 5a.

Bore 17a in valve member 2a is provided with inwardly directed projections 33 which are equidistantly spaced around bore 17a from valve seat 18a to a position about halfway to the outer end of valve member 2a.

Apertured holding member 34 has a sealing member 35 disposed therein for engagement with valve seat 18a by coil spring 36 disposed between holding member 34 and retaining member 37 which is provided with a tubular section 38 disposed within coil spring 36 and a frustoconical section 39 having teeth 40 biting into the wall of bore 17a thereby applying sufficient pressure on coil spring 36 to maintain sealing member 35 in engagement with valve seat 18a. Holding member 34 is rolled in at its outer end into engagement with sealing member 35 to obviate any sharp edges and to hold sealing member 35 therein.

To assemble this bypass valve, holding member 34 with sealing member 35 positioned therein is inserted into bore 17a so that sealing member 35 is directed toward valve seat 18a. Coil spring 36 is inserted into bore 17a and retaining member 37 is forcefully driven along bore 17a with tubular section 38 disposed within coil spring 36. Retaining member 37 is driven along bore 17a with teeth 40 biting into the wall thereof as retaining member 37 is moved therealong until spring 36 is under a predetermined spring tension to maintain sealing member 35 in sealing engagement with valve seat 18a whereupon the driving force on retaining member 37 is stopped and teeth 40 anchor retaining member 37 in position along bore 17a. Such an arrangement assures that the bypass valve will only work when pressure of the fluid exceeds the pressure of the coil spring 36 thereby forcing sealing member 35 away from valve seat 18a.

Projections 33 acts as guide means to guide holding member 35 along bore 17a and to properly position the end of coil spring 36 acting against holding member 34 within bore 17a.

The arcuate areas 41, 42, and 43 created between projections 33 at the valve seat 18a provides an area slightly less than the area of the bore at the engagement of the sealing member 35 on the valve seat of the bore 17a. Such an arrangement permits a back pressure to be created on the sealing assembly of holding member 34 and sealing member 35 to cause collapse of coil spring 36 thereby permitting a sufficient opening between the sealing member 35 and the valve seat 18a allowing sufficient area therebetween so that a large amount of fluid is bypassed as a result of excessive pressure occurring at the valve seat; however, the back pressure created on the sealing assembly of holding member 34 and sealing member 35 is such that operation of the bypass valve occurs until the pressure of the fluid is less than the pressure created by coil spring 36 to maintain sealing member 35 in position on valve seat 18a. Such an arrangement acts to control the action of the bypass valve to the extent that loss of fluid is minimized due to the intermittent operation of the bypass valve to permit the pressure of the fluid and the pressure created by the coil spring to be equalized when the conditions causing the excessive pressure on the fluid abate.

FIG. 7 illustrates a valve Vb which is a further embodiment of the invention. In this embodiment, crimpable section 27b is disposed at right angles with respect to the disposition of valve member 2b in order that valve Vb will have a low profile relative to valve Va; otherwise, valve Vb is similar in construction to valve Va of FIGS. 4 through 6.

This low profile is an important feature, especially when valve Bv is used on a container of refrigerant gas, such as Freon, because it may have to be dispensed in vapor form from the top of the container or in liquid form from the container in an inverted position. Thus, valve Vb can be easily operated when the container is in an inverted position.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A valve comprising a valve body having a passageway extending therethrough, said passageway including a valve seat and a sealing section spaced therefrom, a valve member movably disposed in said passageway, a seating surface provided on said valve member for sealing engagement with said valve seat, means provided by said body and said valve member to maintain said valve member within said passageway and to permit movement of said valve member along said passageway so that said seating surface can be moved into and out of engagement with said valve seat, sealing-skirt means on said valve member which is in sealing engagement with said sealing section and remains in sealing engagement with said sealing section during movement of said seating surface into and out of engagement with said valve seat, said valve member including a bore therethrough, and bypass valve means seated in said valve member bore and movable to an unseated condition for permitting communication of said valve member bore and said valve body passageway.

2. A valve according to claim 1 wherein said valve body has means for connection to a pressurized source of fluid supply which is in axial alignment with said member.

3. A valve according to claim 1 wherein said valve body has means for connection to a pressurized source of fluid supply which is generally offset to the disposition of said valve member.

4. A valve according to claim 1 wherein said means provided by said valve body and said valve member to maintain said valve member within said passageway comprises cooperating threaded section means along said passageway and said valve member, 5. The structure as recited in claim 1, and further including:
a nipple connected to said valve body and provided with a nipple passageway therethrough communicating with said valve body passageway, said seating surface in seating engagement with said valve seat interrupting communication between said nipple passageway and said valve body passageway.

6. A valve according to claim 1 wherein said bypass valve means includes another valve seat within said bore, sealing means in removable sealing engagement with said another valve seat, spring means maintaining said sealing means in sealing engagement with said another valve seat, and retaining means retaining said spring means under spring compression so that said spring means maintains said sealing means in sealing engagement with said another valve seat under the action of said spring compressing.

7. A valve according to claim 6 and further including guide means within said bore for guiding said sealing means into removable sealing engagement with said another valve seat.

8. In a valve, a member having a bore extending therethrough, a valve seat provided by said bore, projections extending outwardly from said bore at spaced locations therearound, said projections extending axially along said bore from said valve seat to a position spaced from said valve seat, said bore between said projections defining arcuate sections having a total area at the downstream side of said valve seat slightly less than the area of the entrance to the valve seat, sealing member means disposed against said valve seat, spring means engaging said sealing member means, retaining means secured in said bore and retaining said spring means in compression so that said spring means maintains said sealing member means against said valve seat under a predetermined spring pressure, and teeth means on said retaining means for biting into said valve member thereby anchoring said retaining means in said bore.

9. In a valve according to claim 8 wherein said projections define guide means for guiding said sealing member means along said bore.

10. In a valve according to claim 8 wherein said retaining means includes a tubular section, said spring means is a coil spring, said tubular section being disposed within the end of said coil spring positioned against said retaining means.

PO-1050
(5/69)

UNITED STATES PATENT OFFICE
CERTIFICATE OF CORRECTION

Patent No. 3,601,154            Dated August 24, 1971

Inventor(s) HENRY WILLIAM DEMLER, SR.

It is certified that error appears in the above-identified patent and that said Letters Patent are hereby corrected as shown below:

The inventor's name should read

"Henry William Demler, Sr." instead of - - -

Henry William Demler, Jr. - - -.

Signed and sealed this 4th day of January 1972.

(SEAL)
Attest:

EDWARD M. FLETCHER, JR.      ROBERT GOTTSCHALK
Attesting Officer               Acting Commissioner of Patents